(12) United States Patent
Touzard

(10) Patent No.: US 11,993,115 B2
(45) Date of Patent: May 28, 2024

(54) SPRING ELEMENT, IN PARTICULAR JOUNCE BUMPER, FOR A VEHICLE SHOCK ABSORBER

(71) Applicant: BASF Polyurethanes GmbH, Lemfoerde (DE)

(72) Inventor: Anthony Touzard, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 384 days.

(21) Appl. No.: 17/595,141

(22) PCT Filed: May 13, 2020

(86) PCT No.: PCT/EP2020/063263
§ 371 (c)(1),
(2) Date: Nov. 10, 2021

(87) PCT Pub. No.: WO2020/229508
PCT Pub. Date: Nov. 19, 2020

(65) Prior Publication Data
US 2022/0194154 A1 Jun. 23, 2022

(30) Foreign Application Priority Data
May 13, 2019 (EP) .................................... 19174219

(51) Int. Cl.
*B60G 11/22* (2006.01)
*B60G 13/00* (2006.01)

(52) U.S. Cl.
CPC ........ *B60G 11/22* (2013.01); *B60G 2202/143* (2013.01); *B60G 2202/32* (2013.01);
(Continued)

(58) Field of Classification Search
CPC .............. B60G 11/22; B60G 2202/143; B60G 2202/32; B60G 2204/4502; B60G 2206/42; B60G 2206/73; B60G 2800/162
See application file for complete search history.

(56) References Cited

U.S. PATENT DOCUMENTS 5,257,730 A * 11/1993 Nakaura ................ F16F 1/3605
267/140.3
5,308,104 A * 5/1994 Charles ...................... F16F 9/58
280/124.155
(Continued)

FOREIGN PATENT DOCUMENTS

| CN | 109073032 | 12/2018 |
|---|---|---|
| DE | 10 2016 211531 | 12/2017 |
| JP | H07-257132 | 10/1995 |

OTHER PUBLICATIONS

International Search Report dated Aug. 7, 2020, in PCT/EP2020/063263, 3 pages.
(Continued)

*Primary Examiner* — Robert A. Siconolfi
*Assistant Examiner* — James K Hsiao
(74) *Attorney, Agent, or Firm* — Grüneberg and Myers PLLC

(57) ABSTRACT

A spring element, in particular a jounce bumper, for a vehicle shock absorber contains a longitudinal axis, a base body extending along the longitudinal axis, and an end portion configured for contact against a damper cap of the vehicle shock absorber. The base body is elastically deformable between an uncompressed basic state and a compressed state in which the base body is at least partially compressed in the direction of the longitudinal axis. The end portion contains at least three projections that are spaced apart from one another in a circumferential direction, and protrude from the base body in the direction of the longitudinal axis. Each (Continued)

of the projections has a distinct length in the direction of the longitudinal axis, and the projections are arranged along the circumference of the end portion such that the lengths of the projections increase monotonously in the circumferential direction.

18 Claims, 3 Drawing Sheets

(52) U.S. Cl.
CPC .. *B60G 2204/4502* (2013.01); *B60G 2206/42* (2013.01); *B60G 2206/73* (2013.01); *B60G 2800/162* (2013.01)

(56) References Cited

U.S. PATENT DOCUMENTS

| | | | | |
|---|---|---|---|---|
| 6,296,237 | B1 | 10/2001 | Nagai | |
| 6,908,076 | B2* | 6/2005 | Hayashi | F16F 1/3814 280/124.155 |
| 8,191,692 | B2* | 6/2012 | Mori | F16F 9/585 267/179 |
| 8,210,508 | B2* | 7/2012 | Hwang | F16F 1/3732 267/153 |
| 8,931,768 | B2* | 1/2015 | Geisler | B60G 15/067 267/140.3 |
| 9,764,612 | B2* | 9/2017 | Al-Dahhan | F16F 3/093 |
| 9,982,735 | B2* | 5/2018 | Thye-Moormann | F16F 1/3732 |
| 10,857,847 | B2* | 12/2020 | Marck | B60G 7/04 |
| 11,255,402 | B2 | 2/2022 | Thye-Moormann | |
| 11,413,920 | B2* | 8/2022 | Touzard | F16F 1/376 |
| 2010/0025903 | A1* | 2/2010 | Thye-Moormann | F16F 1/3732 267/153 |
| 2013/0119593 | A1* | 5/2013 | Konno | B60G 11/22 267/293 |
| 2013/0161888 | A1* | 6/2013 | Szekely | B60G 15/06 267/220 |
| 2018/0245652 | A1* | 8/2018 | Al-Dahhan | F16F 1/377 |
| 2019/0118599 | A1* | 4/2019 | Marck | F16F 1/3732 |
| 2019/0136929 | A1* | 5/2019 | Thye-Moormann | B60G 11/22 |
| 2020/0309224 | A1 | 10/2020 | Ehinger et al. | |
| 2022/0153077 | A1* | 5/2022 | Touzard | F16F 1/376 |

OTHER PUBLICATIONS

Written Opinion dated Aug. 7, 2020, in PCT/EP2020/063263, 6 pages.

* cited by examiner

SPRING ELEMENT, IN PARTICULAR JOUNCE BUMPER, FOR A VEHICLE SHOCK ABSORBER

CROSS-REFERENCE TO RELATED APPLICATIONS

This application is the National Stage entry under § 371 of International Application No. PCT/EP2020/063263, filed on May 13, 2020, and which claims the benefit of priority to European Application No. 1914219.6, filed on May 13, 2019. The content of each of these applications is hereby incorporated by reference in its entirety.

BACKGROUND OF THE INVENTION

Field of the Invention

The invention relates to a spring element, in particular jounce bumper, for a vehicle shock absorber. The invention furthermore relates to a vehicle shock absorber having such a spring element, and to a vehicle, in particular to a passenger motor vehicle having such a shock absorber.

Description of Related Art

Spring elements of the aforementioned type are generally known. They are used in cars, for example inside the chassis. They are used in particular as vibration-damping spring elements. In addition to the main shock absorber, which is frequently based on metal springs and/or compressed gas elements, use is virtually always made of additional spring elements (additional shock absorbers), preferably composed of resilient material. These spring elements are customarily hollow bodies which are formed concentrically and have different diameters and/or wall thicknesses along the spring axis. In principle, these spring elements could also act as main shock absorbers, but they frequently take on an end stop function in combination with the main shock absorber. They influence the force-travel characteristic of the sprung wheel here by the formation or reinforcement of a progressive characteristic of the vehicle suspension. The pitching effects of the vehicle can thus be reduced and the rolling support reinforced. In particular, the starting rigidity is optimized by the geometrical configuration; this has a crucial effect on the suspension comfort of the vehicle. This function increases the driving comfort and ensures a very high degree of driving safety. The specific configuration of the geometry results in virtually constant component properties over the service life.

One difficulty of the three-dimensional configuration of spring element, i.e. jounce bumper, resides in a frequently desired, particularly soft initial force absorption, which is also referred to as soft starting of the spring element. In order to achieve such a soft starting, DE 102004049638 A1, for example, describes forming an end portion of the spring element with encircling bending lips (also referred to as a "flower shape").

In operation, the spring element is compressed from an uncompressed basic state along its longitudinal axis into an at least partially compressed state, thereby dissipating energy by deforming. As has been explained above, the initial stages of the deformation of the spring element determine how soft the spring is perceived. Thus, minimal resistance is desired at the initiation of deformation. Since the overall impact forces on the spring element are significant in vehicle operation, however, the spring element needs to withstand substantial dampening, thus leading to a demand for a progressive increase in stiffness. Apart from the overall modification of the circumferential geometry of the spring element, there was thus a desire to provide further improvements to the spring element which allow soft deformation response in the initial deformation stages on the one hand side, but also provide progressive deformation resistance with increasing deformation on the other hand side.

SUMMARY OF THE INVENTION

It was therefore an object of the invention to provide a spring element of the initially mentioned type which addresses the drawbacks found in the prior art as much as possible. In particular, it was an object of the invention to provide a spring element which allows for soft initial deformation and at the same time improved progressive stiffness with increasing deformation.

The invention achieves the object by suggesting a spring element of the initially mentioned type comprising a longitudinal axis and a base body extending along the longitudinal axis, the base body being elastically deformable between an uncompressed basic state and a compressed state in which the base body is at least partially compressed in the direction of the longitudinal axis, an end portion configured for contact against a damper cap of the vehicle shock absorber; wherein the end portion comprises a plurality of at least three projections that are spaced apart from one another in a circumferential direction and protrude from the base body in the direction of the longitudinal axis; wherein each of the projections has a distinct length in the direction of the longitudinal axis, and the projections are arranged along the circumference of the end portion such that the lengths of the projections increase monotonously in the circumferential direction.

DETAILED DESCRIPTION OF THE INVENTION

Figure 1:
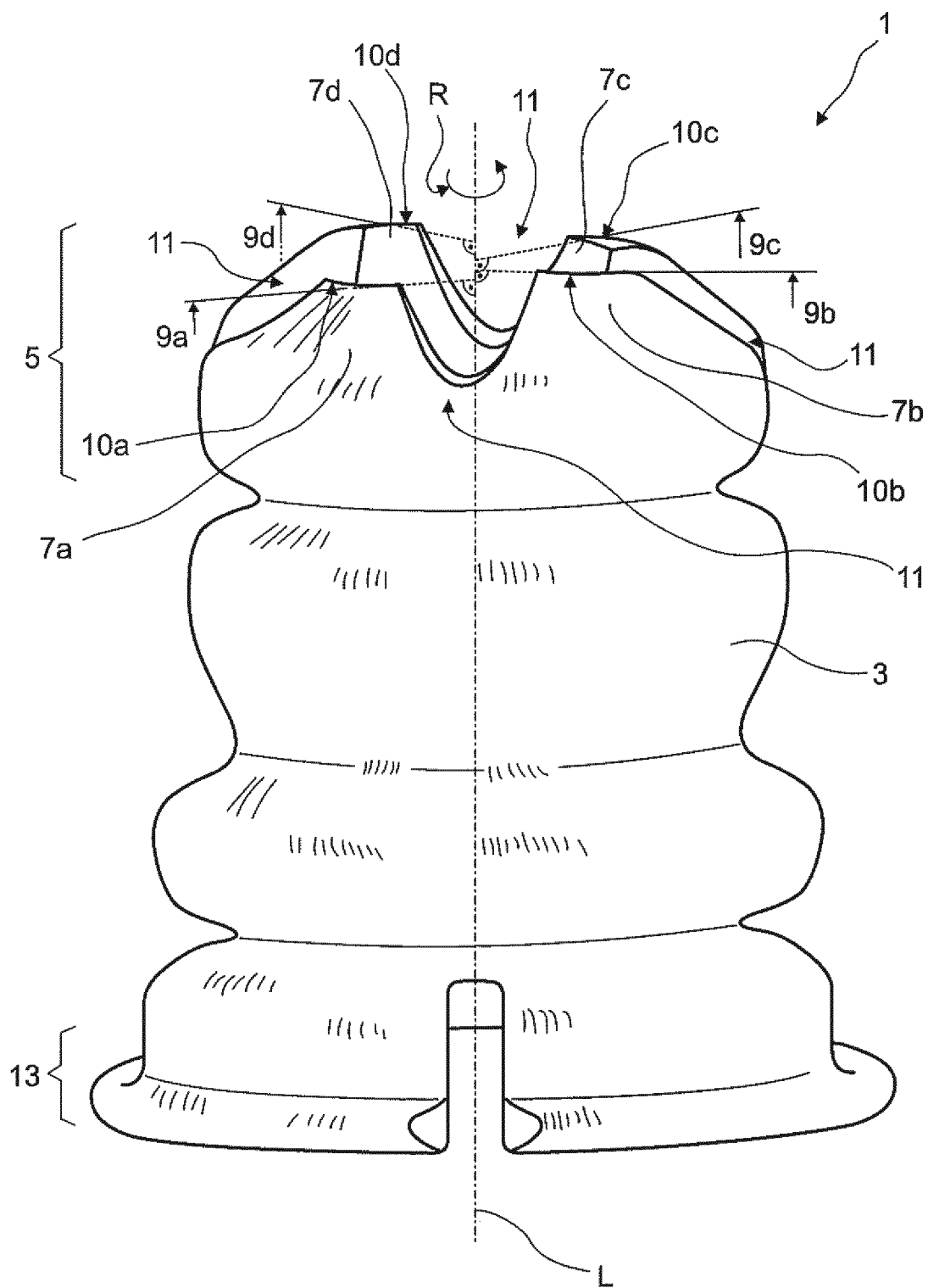
FIG. 1 shows a schematic three dimensional representation of a spring element of a preferred embodiment.

The invention is based upon the realization that by reducing the overall contact surface of the end portion of the spring element reduces the resistance to deformation initial deformation stages. According to the invention, this is achieved by having not the entire circumference of the end portion come into contact with the damper cap, but to have only a portion, namely only a first projection, make the first contact with the damper cap, such that only the contact surface of this first projection needs to be deformed. It has been found that although the end portion will be slightly deformed in an asymmetrical way during initial deformation, there is no overall negative impact on the compression characteristics of the spring element, quite to the contrary. When the compression increases from the initial contact onwards, one or more further projections will subsequently come into contact with the damper cap, one after the other, along the direction of the circumference of the end portion such that the effects of the asymmetrical force impact are mitigated. At the same time, with each further projection coming into contact with the damper cap, the stiffness of the spring element and thus its resistance to compression distinctly increases, leading to a progressive compression resistance. It has been found that the monotonous variation of the projections in the circumferential direction is superior to, for example, alternating height differences of the projections, because both progressivity at initial softness are improved.

In a preferred embodiment, the plurality of projections comprises a first projection having the shortest length in the direction of the longitudinal axis, at least one intermediate projection and a last projection having the longest length in the direction of the longitudinal axis. Preferably, the length of the projections in the direction of the longitudinal axis increases, starting from the first projection, for each subsequent projection in the circumferential direction by a predetermined length differential. Similar to wound stair cases or helical configurations, the length of the projections may increase in a right hand direction, or in a left hand direction.

In a further preferred embodiment, the predetermined length differential is in a range of 0.5 millimeter to 3 millimeter, preferably 0.8 millimeter to 1.2 millimeter.

Further preferably, the length differential is a function of a total length of the based body in the basic state, in the direction of the longitudinal axis, the function being $d=c \times t$, with d being the length differential, c being a length coefficient and t being the total length of the base body, said coefficient c preferably being in a range of 0,005 to 0,04, preferably in a range of 0.0067 to 0.025.

In a further preferred embodiment, the length of the projections in the direction of the longitudinal axis increases, starting from the first projection, for each subsequent projection by a constant length differential, or by a length differential that is linearly proportional to the angular space to the first projection where each respective projection, in the circumferential direction. In alternative embodiments, the projections may either be evenly distributed along the circumference of the end portion, or may be placed at individual angular intervals with respect to the respective adjacent projections and/or with respect to the first projection.

In further preferred embodiments, each projections comprises a contact surface that defines the first line of contact of the respective projection with the damper cap, the contact surface being oriented in a plane perpendicular to the longitudinal axis. This leads to the entire edge of the projection coming into contact with the damper cap at the same time.

In further preferred embodiments, the end portion comprises a recess extending between each pair of adjacent projections. In other words, for an end portion having three projections, the recesses would be separated from one another by a total of three recesses accordingly, wherein four projections would be separated by a total of four recesses etc.

By forming a recess in between adjacent projections, the flexibility and capability of deformation for each projection is improved in that it is rendered mechanically more independent of the adjacent projections.

In a further preferred embodiment, the base body is partly or completely composed of an elastomer that is compressible in volume, preferably of a cellular polyisocyanate polyaddition product.

The base body here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m3 to 1100 kg/m3, preferably 300 kg/m3 to 800 kg/m3, a tensile strength according to DIN 53571 of 2 N/mm2, preferably 2 N/mm2 to 8 N/mm2, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP A 62 835, EP A 36 994, EP A 250 969, DE A 195 48 770 and DE A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two stage process:
 (a) isocyanate,
 (b) compounds reactive to isocyanates,
 (c) water and optionally
 (d) catalysts,
 (e) blowing agents and/or
 (f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high pressure technology, low pressure technology or in particular reaction injection molding technology (RIM) in open or preferably closed molding tools. The reaction is carried out in particular by compression in a closed molding tool. The reaction injection molding technology is described, for example, by H. Piechota and H. Rohr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

The invention has herein above been described with respect to the spring element itself in a first aspect. In a second aspect, the invention also relates to a vehicle shock absorber having a damper bearing, a damper cap mounted movably relative to the damper bearing in a direction of a longitudinal axis, and a spring element is associated with the damper bearing.

In terms of the invention, associating the spring element with the damper bearing and compasses mounting the spring element directly to the damper bearing, or having one or more mechanical amendments intermediate between the spring element and the damper bearing. In particular, the spring element is formed as a jounce bumper.

The invention achieves the initially mentioned object of the first aspect also with respect to the vehicle shock absorber in that the spring element is formed in accordance with any one of the preferred and embodiments described herein above.

The preferred embodiments and benefits of the spring element of the first aspect are at the same time also preferred and embodiments and benefits of the vehicle shock absorber of the second aspect, which is why reference is made to the explanations given above to avoid unnecessary repetition.

In a further aspect the invention, also release to a vehicle comprising a number of vehicle shock absorbers. The invention achieves the object also with respect to the vehicle itself in that at least one of the shock absorbers, preferably some or all of the shock absorbers, are configured according to any one of the preferred embodiments described herein above.

Again the preferred embodiments and benefits of the spring element and of the vehicle shock absorber are at the same time also preferred embodiment and benefits of the vehicle which is why reference is made to the explanations given above to avoid unnecessary repetition.

Figure 2:
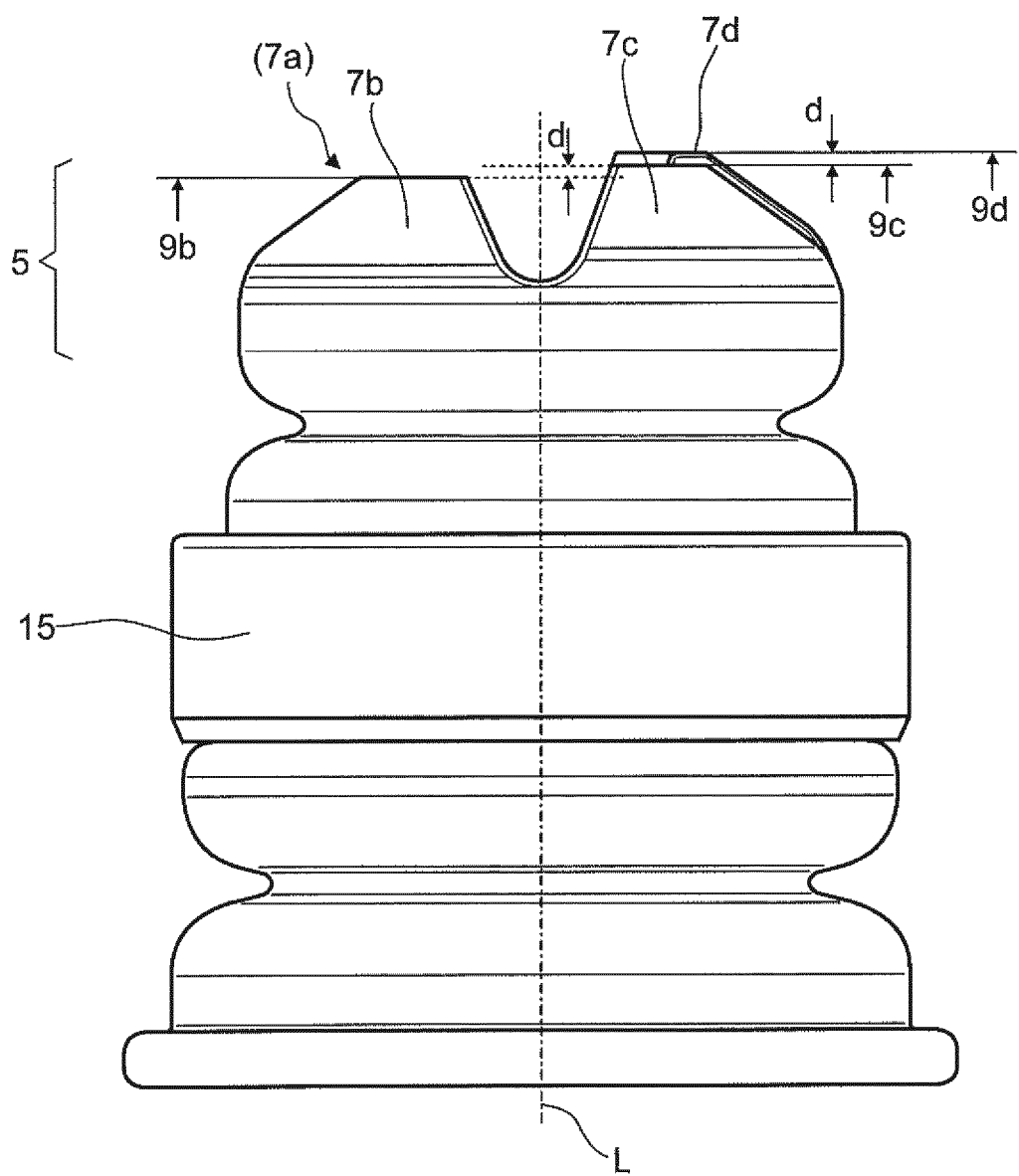
FIG. 2 shows a schematic side-view of the spring element of FIG. 1.
Figure 3:
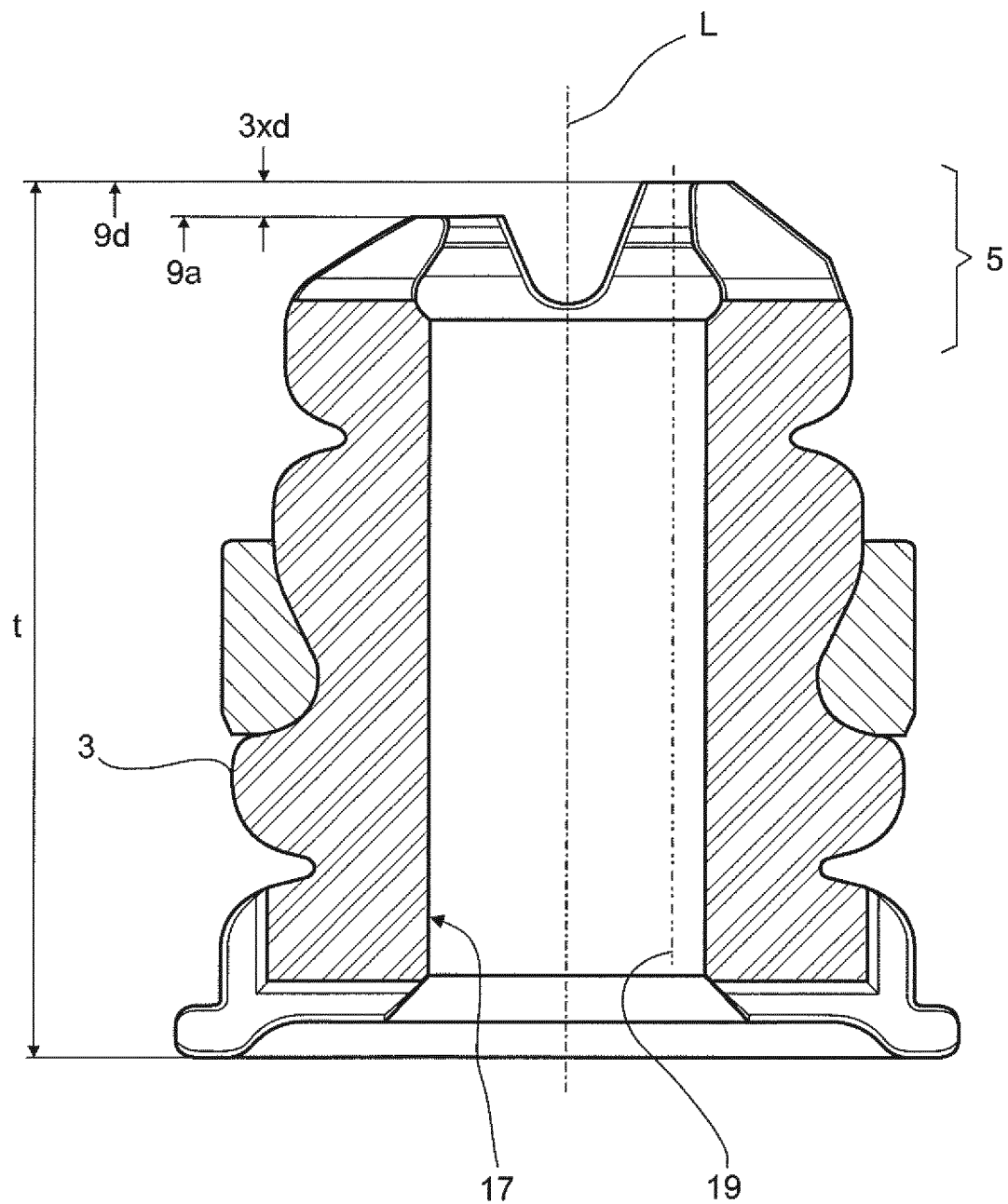
FIG. 3 shows a cross-sectional view of the spring element of FIG. 1 and FIG. 2.

The invention will hereinafter be described in more detail with reference to the accompanying drawings of a preferred embodiments herein, FIG. 1 shows a schematic three dimensional representation of a spring element of a preferred embodiment, FIG. 2 shows a schematic side-view of the spring element of FIG. 1, and FIG. 3 shows a cross-sectional view of the spring element of FIGS. 1 and 2.

FIGS. 1 through 3 show a spring element 1 in the form of a jounce bumper. Identical reference signs designate identical elements throughout the drawings. The spring element 1 comprises a base body 3 made out of a microcellular polyurethane foam as described in the preferred embodiments herein above. The base body 3 comprises a longitudinal axis L and a first end portion 5 in which a plurality of projections 7a-d form a so-called flower contour.

Each of the projections 7a, b, c, d comprises a distinct length 9 a, b, c, d in the direction of the longitudinal axis L. The longitudinal axis L is typically coaxial to the direction of compression of the spring element 1 in operation.

The longitudinal axis L defines a circumferential direction indicated by arrow R. In the preferred embodiment shown the length 9a-d of the projections 7a-d increase monotonously in the circumferential direction R in a right-handed pitch. A first projection 7a has a minimal length 9a. A second projection 7b, which is a first intermediate projection, has a second length 9b, which is greater than the first length 9a. A third projection 7c, which here is a second intermediate projection, has a third length 9c, which is greater than the first and second lengths 9a, b. A fourth projection 7d, which is the last projection, comprises a fourth length 9d, which is greater than the first, second and third length 9a, b, c.

The projections 7a, b, c, d terminate with a contact surface 10a, b, c, d respectively. The contact surfaces 10a-d define the lines of first contact of each projection 7a, b, c, d with a damper cap (not shown). The contact surfaces 10a-d are positioned each in a separate plane perpendicular to the longitudinal axis L. The monotonous staggering of the projection length in the direction of the longitudinal axis L provides that one projection at a time comes into contact with the damper cap after another, until all projections are in contact with the damper cap, thus providing a soft, yet progressive dampening characteristic of the end portion 5 in particular.

Opposite of the first end portion 5, the base body 3 comprises a second end portion 13 configured for mounting the spring element 1 to the damper bearing of a shock absorber assembly.

As can be seen in particular in FIGS. 2 and 3, each projection 7a-d varies in length with respect to its adjacent projections by a predetermined length differential d. In the embodiment shown, the projections 7a, b, c, d are distributed evenly among the circumference of the end portion 5, each at an angle 90° to the respective adjacent projections. Preferably, the length differential d is constant for all of the projections.

Particularly preferred, the length differential d is a function of the total length t of the base body 3 in the uncompressed state as is described in the preferred embodiments herein above.

Further preferably, the spring element 1 comprises a recess 17 extending all the way through the base body 3 along the longitudinal axis L. The recess 17 preferably comprises a structured surface. The structure of the contact surface preferably is configured in a form of an irregular structuring, or a regular structure, such as in a form of simple or crosswise grooving, pimpling or polygonal contouring. If formed as an irregular structuring, the structure preferably has the form of a graining.

The graining preferably is also present in the end portion 5, at least in parts of the contact surface of the projections 7a, b, c, d.

While FIG. 1 shows the spring element 1 in isolation, FIGS. 2 and 3 show the exemplary use of a support ring 15 mounted to a circumferential groove extending on the outside of the base body 3. The support ring 15 preferably is partly or completely formed of an elastomer or a duromer, and may optionally comprise metal or other material enforcements for increased stiffness in the radial direction.

Well the spring element shown in the accompanying drawings comprises a number of four projections 7a-d, the invention also expanse to spring elements with a varying number of projections, e.g. three or more projections.

The invention claimed is:

1. A spring element for a vehicle shock absorber, comprising:
    a longitudinal axis and a base body extending along the longitudinal axis, the base body being elastically deformable between an uncompressed basic state and a compressed state in which the base body is at least partially compressed in the direction of the longitudinal axis, and an end portion configured for contact against a damper cap of the vehicle shock absorber;

wherein the end portion comprises at least three projections that are spaced apart from one another in a circumferential direction, and protrude from the base body in the direction of the longitudinal axis;

wherein each of the at least three projections has a distinct length in the direction of the longitudinal axis, and the at least three projections are arranged along a circumference of the end portion such that the lengths of the at least three projections increase monotonously in the circumferential direction.

2. The spring element of claim 1, wherein the at least three projections encompasses a first projection having a shortest length in the direction of the longitudinal axis, at least one intermediate projection, and a last projection having a longest length in the direction of the longitudinal axis.

3. The spring element of claim 2, wherein the length of the at least three projections in the direction of the longitudinal axis increases, starting from the first projection, for each subsequent projection in the circumferential direction by a predetermined length differential.

4. The spring element of claim 3, wherein the length differential is in a range of 0.5 mm to 3.0 mm.

5. The spring element of claim 4, wherein the length differential is in a range of 0.8 mm to 1.2 mm.

6. The spring element of claim 3, wherein the length differential is a function of a total length of the base body in the uncompressed basic state, the function being $d = c \times t$, with d being the length differential, c being a length coefficient, and t being the total length of the base body in the uncompressed basic state in the direction of the longitudinal axis.

7. The spring element of claim 6, wherein c is in a range of 0.005 to 0.04.

8. The spring element of claim 6, wherein c is in a range of 0.0067 to 0.025.

9. The spring element of claim 2, wherein the length of the at least three projections in the direction of the longitudinal axis increases, starting from the first projection, for each subsequent projection by a constant length differential, or by a length differential that is linearly proportional to an angular space to the first projection in the circumferential direction.

10. The spring element of claim 1, wherein a first projection of the at least three projections and a last projection of the at least three projections are arranged next to one another on the end portion.

11. The spring element of claim 1, wherein each of the al least three projections comprises a contact surface that defines a first line of contact of the respective projection with the damper cap, the contact surface being oriented in a plane perpendicular to the longitudinal axis.

12. The spring element of claim 1, wherein the end portion comprises a recess extending between each adjacent pair of the at least three projections.

13. The spring element of claim 1, wherein the base body is partly or completely composed of an elastomer that is compressible in volume.

14. The spring element of claim 13, wherein the base body is partly or completely composed of a cellular polyisocyanate poly addition product.

15. A vehicle shock absorber, having
a damper bearing;
a damper cap mounted movably relative to the damper bearing in a direction of a longitudinal axis; and
a spring element associated with the damper bearing,
wherein the spring element associated e damper bearing is the spring element according to claim 1.

16. A vehicle, comprising arrurnber of vehicle shock absorbers, wherein at least one of the shock absorbers is the vehicle shock absorber according to claim 15.

17. A vehicle, wherein each shock absorber of the vehicle is the vehicle shock absorber according to claim 15.

18. The spring element of claim 1, wherein the spring element is a jounce bumper.

* * * * *